(12) United States Patent
Bassett

(10) Patent No.: US 8,770,308 B2
(45) Date of Patent: *Jul. 8, 2014

(54) ROW UNIT FOR AGRICULTURAL IMPLEMENT

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/747,325

(22) Filed: Jan. 22, 2013

(65) Prior Publication Data

US 2013/0133904 A1 May 30, 2013

Related U.S. Application Data

(62) Division of application No. 12/882,627, filed on Sep. 15, 2010.

(51) Int. Cl.
| | |
|---|---|
| *A01B 63/00* | (2006.01) |
| *A01B 33/00* | (2006.01) |
| *A01B 63/111* | (2006.01) |
| *A01B 63/24* | (2006.01) |
| *A01B 61/04* | (2006.01) |
| *A01B 33/02* | (2006.01) |

(52) U.S. Cl.
CPC ............... *A01B 63/111* (2013.01); *A01B 63/24* (2013.01); *A01B 61/046* (2013.01); *A01B 61/044* (2013.01); *A01B 33/024* (2013.01); Y10S 111/927 (2013.01)
USPC ................. 172/2; 701/50; 111/135; 111/163; 111/193; 111/200; 111/927

(58) Field of Classification Search
CPC .... A01B 63/114; A01B 63/111; A01B 63/10; A01B 63/02; A01B 63/00; A01B 63/32; A01B 63/24; A01B 63/22; A01B 63/16; A01B 63/008; A01B 61/046; A01B 61/044; A01B 61/04; A01B 61/00; A01B 33/087; A01B 33/08; A01B 33/00; A01B 33/24; A01B 79/005; A01B 79/02; A01C 7/203; A01C 7/205; A01C 7/201; A01C 7/20; A01C 7/208; A01C 7/00; E02F 9/2029; E02F 9/2033; E02F 9/2037; E02F 9/2025; E02F 9/20; E02F 9/00; E02F 9/2271; E02F 9/2264; E02F 9/2257; E02F 9/2221; E02F 9/2217; E02F 9/2207; E02F 9/2203; E02F 9/22; E02F 5/027; E02F 5/02; E02F 5/00
USPC ......... 111/139, 140, 143, 157, 163, 167, 168, 111/52, 59, 62, 63, 65, 66, 149, 135, 134, 111/164–166, 169, 190–196, 200, 900, 111/927; 172/551, 624.5, 705, 613, 619, 172/624, 634, 635, 639, 661, 677–681, 684, 172/684.5, 734, 739, 744, 748, 261, 172/264–268, 518, 579, 583, 605, 4, 2, 172/413; 701/50
See application file for complete search history.

(56) References Cited

U.S. PATENT DOCUMENTS

| 114,002 A | 4/1871 | Godfrey |
|---|---|---|
| 353,491 A | 2/1886 | Wells |

(Continued)

FOREIGN PATENT DOCUMENTS

| BE | 551372 | 10/1956 |
|---|---|---|
| CA | 530673 | 9/1956 |

(Continued)

OTHER PUBLICATIONS

John Deere, Seat Catalog, date estimated as early Sep. 2011 (19 pages).

(Continued)

*Primary Examiner* — Christopher J Novosad
(74) *Attorney, Agent, or Firm* — Nixon Peabody LLP

(57) ABSTRACT

An agricultural row unit includes a linkage pivotably coupled to an attachment frame, and a row unit frame with a leading end pivotably coupled to the linkage. A hydraulic cylinder is coupled to the attachment frame and the linkage, for urging the row unit frame downwardly toward the soil, and includes a movable ram extending into the cylinder. A hydraulic-fluid cavity is located within the cylinder for receiving pressurized hydraulic fluid for advancing the ram in a direction that pivots the linkage and the row unit frame downwardly toward the soil. An accumulator is positioned adjacent to the hydraulic cylinder and has a fluid chamber containing a diaphragm, with the portion of the chamber on one side of the diaphragm being connected to the hydraulic-fluid cavity in the hydraulic cylinder, and the portion of the chamber on the other side of the diaphragm containing a pressurized gas.

11 Claims, 9 Drawing Sheets

(56) References Cited

U.S. PATENT DOCUMENTS

| | | | |
|---|---|---|---|
| 523,508 A | 7/1894 | Bauer et al. | |
| 736,369 A | 8/1903 | Dynes et al. | |
| 803,088 A | 10/1905 | Barker | |
| 1,134,462 A | 4/1915 | Kendrick | |
| 1,158,023 A | 10/1915 | Beaver | |
| 1,247,744 A | 11/1917 | Trimble | |
| 1,260,752 A | 3/1918 | Casaday | |
| 1,321,040 A | 11/1919 | Hoffman | |
| 1,391,593 A | 9/1921 | Sweeting | |
| 1,398,668 A | 11/1921 | Bordsen | |
| 1,481,981 A | 1/1924 | Boye | |
| 1,791,462 A | 2/1931 | Bermel | |
| 1,901,299 A | 3/1933 | Johnson | |
| 1,901,778 A | 3/1933 | Schlag | |
| 2,014,334 A | 9/1935 | Johnson | |
| 2,058,539 A | 10/1936 | Welty et al. | |
| 2,269,051 A | 1/1942 | Cahoy | |
| 2,341,143 A | 2/1944 | Herr | |
| 2,505,276 A | 4/1950 | Boroski | |
| 2,561,763 A | 7/1951 | Waters et al. | |
| 2,593,176 A | 4/1952 | Patterson | |
| 2,611,306 A | 9/1952 | Strehlow et al. | |
| 2,612,827 A | 10/1952 | Baggette et al. | |
| 2,691,353 A | 10/1954 | Secondo | |
| 2,692,544 A | 10/1954 | Jessup | |
| 2,715,286 A | 8/1955 | Saveson | |
| 2,754,622 A | 7/1956 | Rohnert | |
| 2,771,044 A | 11/1956 | Putifer | |
| 2,773,343 A | 12/1956 | Oppel | |
| 2,777,373 A | 1/1957 | Pursche | |
| 2,799,234 A | 7/1957 | Chancey | |
| 2,805,574 A | 9/1957 | Jackson, Jr. et al. | |
| 2,925,872 A | 2/1960 | Darnell | |
| 2,960,358 A | 11/1960 | Christison | |
| 3,010,744 A | 11/1961 | Hollis | |
| 3,014,547 A | 12/1961 | Van der Lely | |
| 3,038,424 A | 6/1962 | Johnson | |
| 3,042,121 A | 7/1962 | Broetzman et al. | |
| 3,057,092 A | 10/1962 | Curlett | |
| 3,058,243 A | 10/1962 | McGee | |
| 3,065,879 A | 11/1962 | Jennings et al. | |
| 3,110,973 A | 11/1963 | Reynolds | |
| 3,122,901 A | 3/1964 | Thompson | |
| 3,123,152 A | 3/1964 | Biskis | |
| 3,188,989 A | 6/1965 | Johnston | |
| 3,213,514 A | 10/1965 | Evans | |
| 3,250,109 A | 5/1966 | Spyridakis | |
| 3,314,278 A | 4/1967 | Bergman | |
| 3,319,589 A | 5/1967 | Moran | |
| 3,351,139 A | 11/1967 | Schmitz et al. | |
| 3,355,930 A | 12/1967 | Fedorov | |
| 3,370,450 A | 2/1968 | Scheucher | |
| 3,420,273 A | 1/1969 | Greer | |
| 3,447,495 A | 6/1969 | Miller et al. | |
| 3,539,020 A | 11/1970 | Andersson et al. | 74/527 |
| 3,543,603 A | 12/1970 | Gley | 74/529 |
| 3,561,541 A | 2/1971 | Woelfel | 172/265 |
| 3,576,098 A | 4/1971 | Brewer | 56/295 |
| 3,581,685 A | 6/1971 | Taylor | 111/7 |
| 3,593,720 A | 7/1971 | Botterill et al. | 130/27 |
| 3,606,745 A | 9/1971 | Girodat | 56/20 |
| 3,635,495 A | 1/1972 | Orendorff | 280/415 |
| 3,653,446 A | 4/1972 | Kalmon | 172/4 |
| 3,701,327 A | 10/1972 | Krumholz | 111/81 |
| 3,708,019 A | 1/1973 | Ryan | 172/470 |
| 3,711,974 A | 1/1973 | Webb | 40/63 |
| 3,718,191 A | 2/1973 | Williams | 172/196 |
| 3,749,035 A | 7/1973 | Cayton et al. | 111/85 |
| 3,753,341 A | 8/1973 | Berg, Jr. et al. | 56/400.04 |
| 3,766,988 A | 10/1973 | Whitesides | 172/548 |
| 3,774,446 A | 11/1973 | Diehl | 73/194 |
| 3,906,814 A | 9/1975 | Magnussen | 74/483 PB |
| 3,939,846 A | 2/1976 | Drozhzhin et al. | 130/27 |
| 3,945,532 A | 3/1976 | Marks | 222/55 |
| 3,975,890 A | 8/1976 | Rodger | 56/208 |
| 4,009,668 A | 3/1977 | Brass et al. | 111/85 |
| 4,018,101 A | 4/1977 | Mihalic | 74/493 |
| 4,044,697 A | 8/1977 | Swanson | 111/66 |
| 4,055,126 A | 10/1977 | Brown et al. | 111/85 |
| 4,058,171 A | 11/1977 | van der Lely | 172/713 |
| 4,063,597 A | 12/1977 | Day | 172/126 |
| 4,096,730 A | 6/1978 | Martin | 72/352 |
| 4,099,576 A | 7/1978 | Jilani | 172/555 |
| 4,122,715 A | 10/1978 | Yokoyama et al. | 73/228 |
| 4,129,082 A | 12/1978 | Betulius | 111/7 |
| 4,141,200 A | 2/1979 | Johnson | 56/10.2 |
| 4,141,302 A | 2/1979 | Morrison, Jr. et al. | 111/52 |
| 4,141,676 A | 2/1979 | Jannen et al. | 417/539 |
| 4,142,589 A | 3/1979 | Schlagenhauf | 172/510 |
| 4,147,305 A | 4/1979 | Hunt | 239/167 |
| 4,149,475 A | 4/1979 | Bailey et al. | 111/66 |
| 4,157,661 A | 6/1979 | Schindel | 73/228 |
| 4,161,090 A | 7/1979 | Watts, Jr. | 52/301 |
| 4,173,259 A | 11/1979 | Heckenkamp | 172/10 |
| 4,182,099 A | 1/1980 | Davis et al. | 56/16.4 |
| 4,187,916 A | 2/1980 | Harden et al. | 172/146 |
| 4,191,262 A | 3/1980 | Sylvester | 172/459 |
| 4,196,567 A | 4/1980 | Davis et al. | 56/13.7 |
| 4,196,917 A | 4/1980 | Oakes et al. | 280/463 |
| 4,206,817 A | 6/1980 | Bowerman | 172/559 |
| 4,208,974 A | 6/1980 | Dreyer et al. | 111/85 |
| 4,213,408 A | 7/1980 | West et al. | 111/85 |
| 4,225,191 A | 9/1980 | Knoski | 301/9 |
| 4,233,803 A | 11/1980 | Davis et al. | 56/14.9 |
| 4,241,674 A | 12/1980 | Mellinger | 111/52 |
| 4,280,419 A | 7/1981 | Fischer | 111/80 |
| 4,295,532 A | 10/1981 | Williams et al. | 172/184 |
| 4,301,870 A | 11/1981 | Carre et al. | 172/7 |
| 4,307,674 A | 12/1981 | Jennings et al. | 111/85 |
| 4,311,104 A | 1/1982 | Steilen et al. | 111/85 |
| 4,317,355 A | 3/1982 | Hatsuno et al. | 72/342 |
| 4,359,101 A | 11/1982 | Gagnon | 172/38 |
| 4,375,837 A | 3/1983 | van der Lely et al. | 172/68 |
| 4,377,979 A | 3/1983 | Peterson et al. | 111/52 |
| 4,407,371 A | 10/1983 | Hohl | 172/253 |
| 4,430,952 A | 2/1984 | Murray | 111/85 |
| 4,433,568 A | 2/1984 | Kondo | 72/356 |
| 4,438,710 A | 3/1984 | Paladino | 111/3 |
| 4,445,445 A | 5/1984 | Sterrett | 111/7 |
| 4,461,355 A | 7/1984 | Peterson et al. | 172/156 |
| 4,481,830 A | 11/1984 | Smith et al. | 73/861.71 |
| 4,499,775 A | 2/1985 | Lasoen | 73/862.57 |
| 4,506,610 A | 3/1985 | Neal | 111/87 |
| 4,508,178 A | 4/1985 | Cowell et al. | 172/239 |
| 4,528,920 A | 7/1985 | Neumeyer | 111/85 |
| 4,530,405 A | 7/1985 | White | 172/126 |
| 4,537,262 A | 8/1985 | van der Lely | 172/146 |
| 4,538,688 A | 9/1985 | Szucs et al. | 172/555 |
| 4,550,122 A | 10/1985 | David et al. | 172/158 |
| 4,553,607 A | 11/1985 | Behn et al. | 172/156 |
| 4,580,506 A | 4/1986 | Fleischer et al. | 111/7 |
| 4,596,200 A | 6/1986 | Gafford et al. | 111/85 |
| 4,603,746 A | 8/1986 | Swales | 172/559 |
| 4,604,906 A | 8/1986 | Scarpa | 73/861.74 |
| 4,630,773 A | 12/1986 | Ortlip | 239/1 |
| 4,643,043 A | 2/1987 | Furuta et al. | 74/503 |
| 4,646,620 A | 3/1987 | Buchl | 91/1 |
| 4,650,005 A | 3/1987 | Tebben | 172/430 |
| 4,669,550 A | 6/1987 | Sittre | 172/559 |
| 4,671,193 A | 6/1987 | States | 111/73 |
| 4,674,578 A | 6/1987 | Bexten et al. | 172/126 |
| 4,703,809 A | 11/1987 | Van den Ende | 172/147 |
| 4,726,304 A | 2/1988 | Dreyer et al. | 111/73 |
| 4,738,461 A | 4/1988 | Stephenson et al. | 280/400 |
| 4,744,316 A | 5/1988 | Lienemann et al. | 111/69 |
| 4,762,075 A | 8/1988 | Halford | 111/73 |
| 4,765,190 A | 8/1988 | Strubbe | 73/861.72 |
| 4,768,387 A | 9/1988 | Kemp et al. | 73/861.73 |
| 4,779,684 A | 10/1988 | Schultz | 171/62 |
| 4,785,890 A | 11/1988 | Martin | 172/29 |
| 4,825,957 A | 5/1989 | White et al. | 172/126 |
| 4,825,959 A | 5/1989 | Wilhelm | 172/720 |
| 4,920,901 A | 5/1990 | Pounds | 111/164 |
| 4,926,767 A | 5/1990 | Thomas | 111/187 |

(56) References Cited

U.S. PATENT DOCUMENTS

| | | | |
|---|---|---|---|
| 4,930,431 A | 6/1990 | Alexander | 111/164 |
| 4,986,367 A | 1/1991 | Kinzenbaw | 172/126 |
| 4,998,488 A | 3/1991 | Hansson | 111/187 |
| 5,015,997 A | 5/1991 | Strubbe | 340/684 |
| 5,027,525 A | 7/1991 | Haukaas | 33/624 |
| 5,033,397 A | 7/1991 | Colburn, Jr. | 111/118 |
| 5,065,632 A | 11/1991 | Reuter | 73/861.73 |
| 5,074,227 A | 12/1991 | Schwitters | 111/137 |
| 5,076,180 A | 12/1991 | Schneider | 111/139 |
| 5,092,255 A | 3/1992 | Long et al. | 111/167 |
| 5,113,957 A | 5/1992 | Tamai et al. | 172/10 |
| 5,129,282 A | 7/1992 | Bassett et al. | 74/529 |
| 5,136,934 A | 8/1992 | Darby, Jr. | 100/125 |
| 5,190,112 A | 3/1993 | Johnston et al. | 172/245 |
| 5,234,060 A | 8/1993 | Carter | 172/413 |
| 5,240,080 A | 8/1993 | Bassett et al. | 172/740 |
| 5,255,617 A | 10/1993 | Williams et al. | 111/140 |
| 5,269,237 A | 12/1993 | Baker et al. | 111/121 |
| 5,282,389 A | 2/1994 | Faivre et al. | 73/861.73 |
| 5,285,854 A | 2/1994 | Thacker et al. | 172/176 |
| 5,333,694 A | 8/1994 | Roggenbuck et al. | 172/156 |
| 5,337,832 A | 8/1994 | Bassett | 172/504 |
| 5,341,754 A | 8/1994 | Winterton | 111/139 |
| 5,346,019 A | 9/1994 | Kinzenbaw et al. | 172/311 |
| 5,346,020 A | 9/1994 | Bassett | 172/540 |
| 5,349,911 A | 9/1994 | Holst et al. | 111/139 |
| 5,351,635 A | 10/1994 | Hulicsko | 111/135 |
| 5,379,847 A | 1/1995 | Snyder | 172/128 |
| 5,394,946 A | 3/1995 | Clifton et al. | 172/139 |
| 5,398,771 A | 3/1995 | Hornung et al. | 172/311 |
| 5,419,402 A | 5/1995 | Heintzman | 172/551 |
| 5,427,192 A | 6/1995 | Stephenson et al. | 180/53.1 |
| 5,443,023 A | 8/1995 | Carroll | 111/191 |
| 5,443,125 A | 8/1995 | Clark et al. | 172/608 |
| 5,461,995 A | 10/1995 | Winterton | 111/139 |
| 5,462,124 A | 10/1995 | Rawson | 172/569 |
| 5,473,999 A | 12/1995 | Rawson et al. | 111/127 |
| 5,477,682 A | 12/1995 | Tobiasz | 60/583 |
| 5,477,792 A | 12/1995 | Bassett et al. | 111/121 |
| 5,479,868 A | 1/1996 | Bassett | 111/139 |
| 5,479,992 A | 1/1996 | Bassett | 172/4 |
| 5,485,796 A | 1/1996 | Bassett | 111/33 |
| 5,485,886 A | 1/1996 | Bassett | 172/763 |
| 5,497,717 A | 3/1996 | Martin | 111/191 |
| 5,497,837 A | 3/1996 | Kehrney | 172/619 |
| 5,499,683 A | 3/1996 | Bassett | 172/4 |
| 5,499,685 A | 3/1996 | Downing, Jr. | 172/699 |
| 5,517,932 A | 5/1996 | Ott et al. | 111/193 |
| 5,524,525 A | 6/1996 | Nikkel et al. | 91/179 |
| 5,531,171 A | 7/1996 | Whitesel et al. | 111/139 |
| 5,542,362 A | 8/1996 | Bassett | 111/120 |
| 5,544,709 A | 8/1996 | Lowe et al. | 172/661 |
| 5,562,165 A | 10/1996 | Janelle et al. | 172/4 |
| 5,590,611 A | 1/1997 | Smith | 111/127 |
| 5,603,269 A | 2/1997 | Bassett | 111/52 |
| 5,623,997 A | 4/1997 | Rawson et al. | 172/156 |
| 5,640,914 A | 6/1997 | Rawson | 111/140 |
| 5,657,707 A | 8/1997 | Dresher et al. | 111/139 |
| 5,660,126 A | 8/1997 | Freed et al. | 111/140 |
| 5,685,245 A | 11/1997 | Bassett | 111/62 |
| 5,704,430 A | 1/1998 | Smith et al. | 172/29 |
| 5,709,271 A | 1/1998 | Bassett | 172/4 |
| 5,727,638 A | 3/1998 | Wodrich et al. | 172/414 |
| 5,852,982 A | 12/1998 | Peter | 111/118 |
| 5,868,207 A | 2/1999 | Langbakk et al. | 172/274 |
| 5,878,678 A | 3/1999 | Stephens et al. | 111/139 |
| RE36,243 E | 7/1999 | Rawson et al. | 111/121 |
| 5,970,891 A | 10/1999 | Schlagel | 111/135 |
| 5,970,892 A | 10/1999 | Wendling et al. | 111/139 |
| 5,988,293 A | 11/1999 | Brueggen et al. | 172/414 |
| 6,067,918 A | 5/2000 | Kirby | 111/121 |
| 6,164,385 A | 12/2000 | Buchl | 172/239 |
| 6,223,663 B1 | 5/2001 | Wendling et al. | 111/139 |
| 6,223,828 B1 | 5/2001 | Paulson et al. | 171/63 |
| 6,237,696 B1 | 5/2001 | Mayerle | 172/558 |
| 6,253,692 B1 | 7/2001 | Wendling et al. | 111/139 |
| 6,314,897 B1 | 11/2001 | Hagny | 111/192 |
| 6,325,156 B1 | 12/2001 | Barry | 172/518 |
| 6,330,922 B1 | 12/2001 | King | 172/166 |
| 6,331,142 B1 | 12/2001 | Bischoff | 460/112 |
| 6,343,661 B1 | 2/2002 | Thompson et al. | 172/444 |
| 6,347,594 B1 | 2/2002 | Wendling et al. | 111/167 |
| 6,382,326 B1 | 5/2002 | Goins et al. | 172/239 |
| 6,389,999 B1 | 5/2002 | Duello | 111/200 |
| 6,453,832 B1 | 9/2002 | Schaffert | 111/150 |
| 6,454,019 B1 | 9/2002 | Prairie et al. | 172/677 |
| 6,460,623 B1 | 10/2002 | Knussman et al. | 172/4 |
| 6,516,595 B2 | 2/2003 | Rhody et al. | 56/10.2 E |
| 6,530,334 B2 | 3/2003 | Hagny | 111/189 |
| 6,575,104 B2 | 6/2003 | Brummelhuis | 111/139 |
| 6,644,224 B1 | 11/2003 | Bassett | 111/157 |
| 6,701,856 B1 | 3/2004 | Zoske et al. | 111/121 |
| 6,701,857 B1 | 3/2004 | Jensen et al. | 111/200 |
| 6,786,130 B2 | 9/2004 | Steinlage et al. | 91/390 |
| 6,834,598 B2 | 12/2004 | Jüptner | 111/140 |
| 6,840,853 B2 | 1/2005 | Foth | 460/111 |
| 6,886,650 B2 | 5/2005 | Bremner | 180/89.13 |
| 6,889,943 B2 | 5/2005 | Dinh et al. | 248/34 |
| 6,912,963 B2 | 7/2005 | Bassett | 111/163 |
| 6,986,313 B2 | 1/2006 | Halford et al. | 111/186 |
| 6,997,400 B1 | 2/2006 | Hanna et al. | 239/383 |
| 7,004,090 B2 | 2/2006 | Swanson | 111/119 |
| 7,044,070 B2 | 5/2006 | Kaster et al. | 111/62 |
| 7,063,167 B1 | 6/2006 | Staszak et al. | 172/328 |
| 7,159,523 B2 | 1/2007 | Bourgault et al. | 111/187 |
| 7,222,575 B2 | 5/2007 | Bassett | 111/140 |
| 7,290,491 B2 | 11/2007 | Summach et al. | 111/181 |
| 7,360,494 B2 | 4/2008 | Martin | 111/164 |
| 7,360,495 B1 | 4/2008 | Martin | 111/164 |
| 7,438,006 B2 | 10/2008 | Mariman et al. | 111/164 |
| 7,451,712 B2 | 11/2008 | Bassett et al. | 111/140 |
| 7,523,709 B1 | 4/2009 | Kiest | 111/119 |
| 7,540,333 B2 | 6/2009 | Bettin et al. | 172/744 |
| 7,575,066 B2 | 8/2009 | Bauer | 172/540 |
| 7,584,707 B2 | 9/2009 | Sauder et al. | 111/140 |
| 7,665,539 B2 | 2/2010 | Bassett et al. | 172/540 |
| 7,673,570 B1 | 3/2010 | Bassett | 111/63 |
| 7,743,718 B2 | 6/2010 | Bassett | 111/135 |
| 7,870,827 B2 | 1/2011 | Bassett | 111/119 |
| 7,938,074 B2 | 5/2011 | Liu | 111/200 |
| 7,946,231 B2 | 5/2011 | Martin et al. | 111/60 |
| 8,146,519 B2 | 4/2012 | Bassett | 111/119 |
| 8,151,717 B2 | 4/2012 | Bassett | 111/135 |
| 8,327,780 B2 | 12/2012 | Bassett | 111/119 |
| 8,359,988 B2 | 1/2013 | Bassett | 111/135 |
| 8,380,356 B1 | 2/2013 | Zielke et al. | 700/284 |
| 8,386,137 B2 | 2/2013 | Sauder et al. | 701/50 |
| 8,393,407 B2 | 3/2013 | Freed | 172/551 |
| 8,408,149 B2 | 4/2013 | Rylander | 111/140 |
| 6,644,224 C1 | 6/2013 | Bassett | 111/157 |
| 6,912,963 C1 | 6/2013 | Bassett | 111/163 |
| 7,222,575 C1 | 6/2013 | Bassett | 111/140 |
| 8,550,020 B2 | 10/2013 | Sauder et al. | 111/200 |
| 8,573,319 B1 | 11/2013 | Casper et al. | 172/4 |
| 8,634,992 B2 | 1/2014 | Sauder et al. | 701/50 |
| 2002/0162492 A1 | 11/2002 | Juptner | 111/140 |
| 2006/0102058 A1 | 5/2006 | Swanson | 111/119 |
| 2006/0191695 A1 | 8/2006 | Walker et al. | 172/452 |
| 2006/0237203 A1 | 10/2006 | Miskin | 172/799.5 |
| 2007/0044694 A1 | 3/2007 | Martin | 111/121 |
| 2007/0272134 A1 | 11/2007 | Baker et al. | 111/163 |
| 2008/0093093 A1 | 4/2008 | Sheppard et al. | 172/2 |
| 2008/0236461 A1 | 10/2008 | Sauder et al. | 111/170 |
| 2008/0256916 A1 | 10/2008 | Vaske et al. | 56/13.5 |
| 2010/0019471 A1 | 1/2010 | Ruckle et al. | 280/504 |
| 2010/0108336 A1 | 5/2010 | Thomson et al. | 172/795 |
| 2010/0180695 A1 | 7/2010 | Sauder et al. | 73/862.045 |
| 2010/0198529 A1 | 8/2010 | Sauder et al. | 702/41 |
| 2010/0282480 A1 | 11/2010 | Breker et al. | 172/170 |
| 2011/0247537 A1 | 10/2011 | Freed | 111/140 |
| 2011/0313575 A1 | 12/2011 | Kowalchuk et al. | 700/282 |
| 2012/0060730 A1 | 3/2012 | Bassett | 111/149 |
| 2012/0060731 A1 | 3/2012 | Bassett | 111/149 |
| 2012/0167809 A1 | 7/2012 | Bassett | 111/119 |

(56) References Cited

U.S. PATENT DOCUMENTS

| | | | |
|---|---|---|---|
| 2012/0186216 A1 | 7/2012 | Vaske et al. | 56/367 |
| 2012/0210920 A1 | 8/2012 | Bassett | 111/140 |
| 2012/0216731 A1 | 8/2012 | Schilling et al. | 111/69 |
| 2012/0232691 A1 | 9/2012 | Green et al. | 700/231 |
| 2012/0255475 A1 | 10/2012 | Mariman et al. | 111/149 |
| 2012/0305274 A1 | 12/2012 | Bassett | 172/5 |
| 2013/0032363 A1 | 2/2013 | Curry et al. | 172/4 |
| 2013/0112121 A1 | 5/2013 | Achen et al. | 111/14 |
| 2013/0112124 A1 | 5/2013 | Bergen et al. | 111/151 |
| 2013/0146318 A1 | 6/2013 | Bassett | 172/5 |
| 2013/0192186 A1 | 8/2013 | Bassett | 56/10.2 E |
| 2014/0026748 A1 | 1/2014 | Stoller et al. | 91/418 |
| 2014/0034339 A1 | 2/2014 | Sauder et al. | 172/2 |
| 2014/0034343 A1 | 2/2014 | Sauder et al. | 172/664 |

FOREIGN PATENT DOCUMENTS

| | | | |
|---|---|---|---|
| DE | 335464 | 9/1921 | 45/5 B |
| DE | 1108971 | 6/1961 | 45/65 A |
| DE | 24 02 411 | 7/1975 | E01C 23/08 |
| EP | 2 497 348 A1 | 9/2012 | A01B 79/00 |
| GB | 1 574 412 | 9/1980 | 111/123 |
| GB | 2 056 238 A | 10/1982 | |
| JP | 54-57726 | 5/1979 | 74/529 |
| SU | 392897 | 8/1973 | |
| SU | 436778 | 7/1974 | |
| SU | 611201 | 6/1978 | 74/527 |
| SU | 625648 | 9/1978 | |
| SU | 1410884 A1 | 7/1988 | |
| SU | 1466674 | 3/1989 | 111/124 |
| WO | WO 2011/161140 A1 | 12/2011 | A01C 7/20 |
| WO | WO 2012/149367 A1 | 1/2012 | A01C 5/00 |
| WO | WO 2012/149415 A1 | 1/2012 | A01B 63/111 |
| WO | WO 2012/167244 A1 | 12/2012 | A01B 5/00 |
| WO | WO 2013/025898 A1 | 2/2013 | B60C 23/02 |

OTHER PUBLICATIONS

Vogt, Willie, "*Revisiting Robotics*," http://m.farmindustrynews.com/farm-equipment/revisiting-robotics, Dec. 19, 2013 (3 pages).
John Deere, New Semi-Active Sea Suspension, http://www.deere.com/en_US/parts/agparts/semiactiveseat.html, date estimated as early as Jan. 2014, retrieved Feb. 6, 2014 (2 pages).
Case Corporation Brochure, Planters 900 Series Units/Modules Product Information, Aug. 1986 (4 pages).
Buffalo Farm Equipment All Flex Cultivator Operator Manual, Apr. 1990 (7 pages).
Shivvers, Moisture Trac 3000 Brochure, Aug. 21, 1990 (5 pages).
The New Farm, "*New Efficiencies in Nitrogen Application*," Feb. 1991, p. 6 (1 page).
Hiniker Company, Flow & Acreage Continuous Tracking System Monitor Demonstration Manuel, date estimated as early as Feb. 1991 (7 pages).
Russnogle, John, "*Sky Spy: Gulf War Technology Pinpoints Field and Yields*," Top Producer, A Farm Journal Publication, Nov. 1991, pp. 12-14 (4 pages).
Borgelt, Steven C., "*Sensor Technologies and Control Strategies for Managing Variability*," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, Retrieved Nov. 2, 2012 (4 pages).
Finck, Charlene, "*Listen to Your Soil*," Farm Journal Article, Jan. 1993, pp. 14-15 (2 pages).
Acu-Grain, "*Combine Yield Monitor 99% Accurate? 'You Bet Your Bushels!!*'" date estimated as early as Feb. 1993 (2 pages).
John Deere, New 4435 Hydro Row-Crop and Small-Grain Combine, date estimated as early as Feb. 1993 (8 pages).
Vansichen, R. et al., "*Continuous Wheat Yield Measurement on a Combine*," date estimated as early as Feb. 1993 (5 pages).
Yetter 2010 Product Catalog, date estimated as early as Jan. 2010 (2 pages).
Yetter Cut and Move Manual, Sep. 2010 (28 pages).
Martin Industries, LLC Paired 13" Spading Closing Wheels Brochure, date estimated as early as Jun. 6, 2012, pp. 18-25 (8 pages).

ROW UNIT FOR AGRICULTURAL IMPLEMENT

CROSS REFERENCE TO RELATED APPLICATIONS

This application is a divisional of U.S. patent application Ser. No. 12/882,627, filed on Sept. 15, 2010, titled "Row Unit for Agricultural Implement," which is incorporated herein its entirety.

FIELD OF THE INVENTION

The present invention relates to agricultural implements and, more particularly, to an agricultural row unit for use with agricultural implements such as planting row units.

BACKGROUND OF THE INVENTION

As an agricultural planter row unit travels across fields with variable soil types, soil moisture, residue levels and topography, it is difficult to maintain constant seed depth and other parameters due to changing conditions which would ideally require varying the row unit down force pressure. For example, farming with higher residue levels also requires higher row unit down force levels as row cleaners, coulters and other attachments require applied force to keep them in the ground and at consistent depths.

At the same time, in many locations there are immoveable rocks or other obstructions at or below the soil surface which require the planter row unit to be able to quickly and freely (without undue increase in the row unit down force) rise up and over the obstruction freely and then quickly move back down, leaving a minimum amount of the row unplanted. All this must be accomplished at ground speeds of 6 mph or more. Today's planters typically include many individual row units, at times up to 120 ft wide, each of which may be encountering rocks etc. or have a need to float up or down independently.

Traditionally springs have been used to urge row units downward. Recently air bag systems have been used to overcome some of the drawbacks to air spring systems. Air systems provide a more uniform down force through the vertical range of travel, compared to springs, and are somewhat easier to adjust than springs. However due to the compressibility of air and the relatively large volumes required, changes in air pressure are very cumbersome and not adaptable to very fast change and response to in-cab controls on the go. Air bag systems typically have a very large cross-sectional area in relation to the hose feeding the air spring with pressure, which can provide a large multiplication of force and allow for relatively good isolation of one row unit relative to another. However, air bag systems typically do not allow for rapid change of the force being applied, because of the large volume of the air spring in relation to the cross section of the hose supplying the air.

Prior attempts to use devices such as combination spring/hydraulic shock absorbers do not provide ready adjustment on the go and tend to increase in force when rapidly striking a foreign object such as a rock requiring the row unit to quickly rise and come back down to resume planting. This increase in force levels can cause damage to the planter row unit components.

Some previous down-force systems use a spring and a hydraulic cylinder in series. In these systems the hydraulic cylinder does not directly control row unit down force, but rather is used to vary the amount of spring pressure applied to each unit.

Other systems use hydraulics with a central accumulator. However, with the accumulator separated from the force creating cylinder, pressure spikes can develop when hitting obstructions such as a rock at high speed since oil must be forced through hoses or tubes to the remotely located accumulator. This is especially problematic on planters having 50 or more row units.

As computers and GPS systems have allowed crop production to be managed in a location-specific way as an implement moves through the field, it has become necessary to achieve more rapid changes in the setting or adjustment of the implement. In the case of a planter row unit, it is also necessary to generate a large amount of force. Each individual planter row unit must be able to react to the soil it encounters independently of the other row units.

An air spring can allow for remote adjustment of the planter down pressure without stopping the forward motion of the implement, which is inefficient. Mechanical springs have historically required that the operator stop the implement, get out of the tractor, and make a manual adjustment. The slow rate at which an air spring system can be inflated or deflated means that even if a GPS system determines that a change needs to be made because of a programmed or sensed change in the local soil composition or conditions, by the time the pump can change the air pressure the implement has already moved too far forward of where the change needed to be made. This forces the average grid size in which active adjustments of the planter down pressure can be made to be quite large.

SUMMARY OF THE INVENTION

In one embodiment, an agricultural row unit for use with a towing frame hitched to a tractor includes an attachment frame adapted to be rigidly connected to the towing frame, a linkage pivotably coupled to the attachment frame, and a row unit frame having a leading end pivotably coupled to the linkage to permit vertical pivoting movement of the row unit frame relative to the attachment frame. At least a furrow-forming device is mounted on the row unit frame. A hydraulic cylinder coupled to the attachment frame and the linkage, for urging the row unit frame downwardly toward the soil, includes a movable ram extending into the cylinder, and a hydraulic-fluid cavity within the cylinder for receiving pressurized hydraulic fluid for advancing the ram in a direction that pivots the linkage and the row unit frame downwardly toward the soil. An accumulator positioned adjacent to the hydraulic cylinder has a fluid chamber containing a diaphragm, with the portion of the chamber on one side of the diaphragm being connected to the hydraulic-fluid cavity in the hydraulic cylinder, and the portion of the chamber on the other side of the diaphragm containing a pressurized gas.

BRIEF DESCRIPTION OF THE DRAWINGS

The invention may best be understood by reference to the following description taken in conjunction with the accompanying drawings, in which.

DETAILED DESCRIPTION OF ILLUSTRATED EMBODIMENTS

Figure 1:
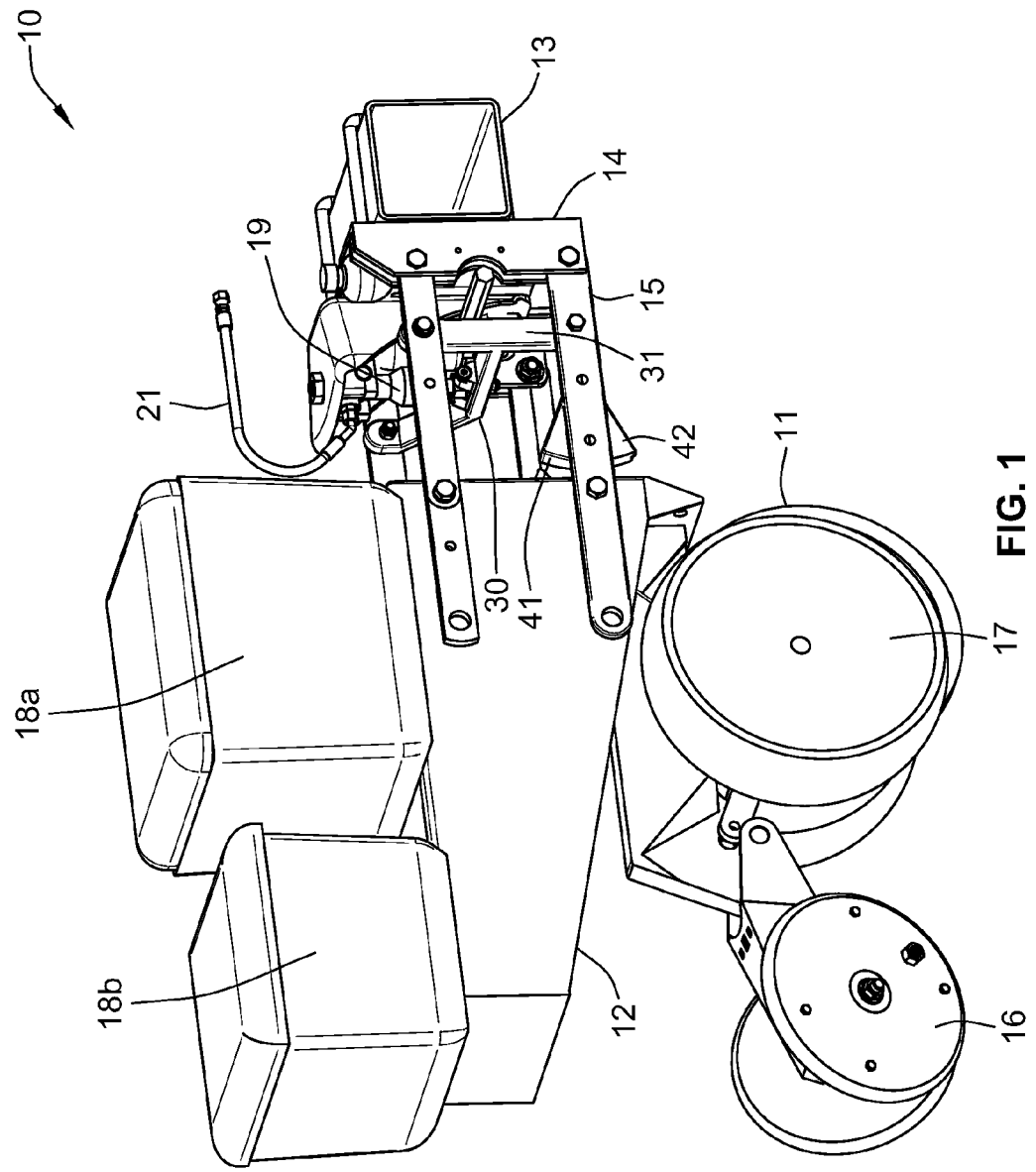
FIG. 1 is a perspective view of a planting row unit attached to a towing frame.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawings, a planting row unit 10 includes a furrow-opening device for the purpose of planting seed or injecting fertilizer into the soil. In the illustrated embodiment, the furrow-opening device is a V-opener 11 formed by a pair of conventional tilted discs depending from the leading end of a row unit frame 12. It will be understood that other furrow-opening devices may be used. A conventional elongated hollow towing frame 13 (typically hitched to a tractor by a draw bar) is rigidly attached to the front frame 14 of a conventional four-bar linkage assembly 15 that is part of the row unit 10. The four-bar (sometimes referred to as "parallel-bar") linkage assembly 15 is a conventional and well known linkage used in agricultural implements to permit the raising and lowering of tools attached thereto.

As the planting row unit 10 is advanced by the tractor, the V-opener 11 penetrates the soil to form a furrow or seed slot. Other portions of the row unit 10 then deposit seed in the seed slot and fertilizer adjacent to the seed slot, and close the seed slot by distributing loosened soil into the seed slot with a pair of closing wheels 16. A gauge wheel 17 determines the planting depth for the seed and the height of introduction of fertilizer, etc. Bins 18a and 18b on the row unit carry the chemicals and seed which are directed into the soil. The planting row unit 10 is urged downwardly against the soil by its own weight, and, in addition, a hydraulic cylinder 19 is coupled between the front frame 14 and the linkage assembly 15 to urge the row unit 11 downwardly with a controllable force that can be adjusted for different soil conditions. The hydraulic cylinder 19 may also be used to lift the row unit off the ground for transport by a heavier, stronger, fixed-height frame that is also used to transport large quantities of fertilizer for application via multiple row units.

Figure 4:
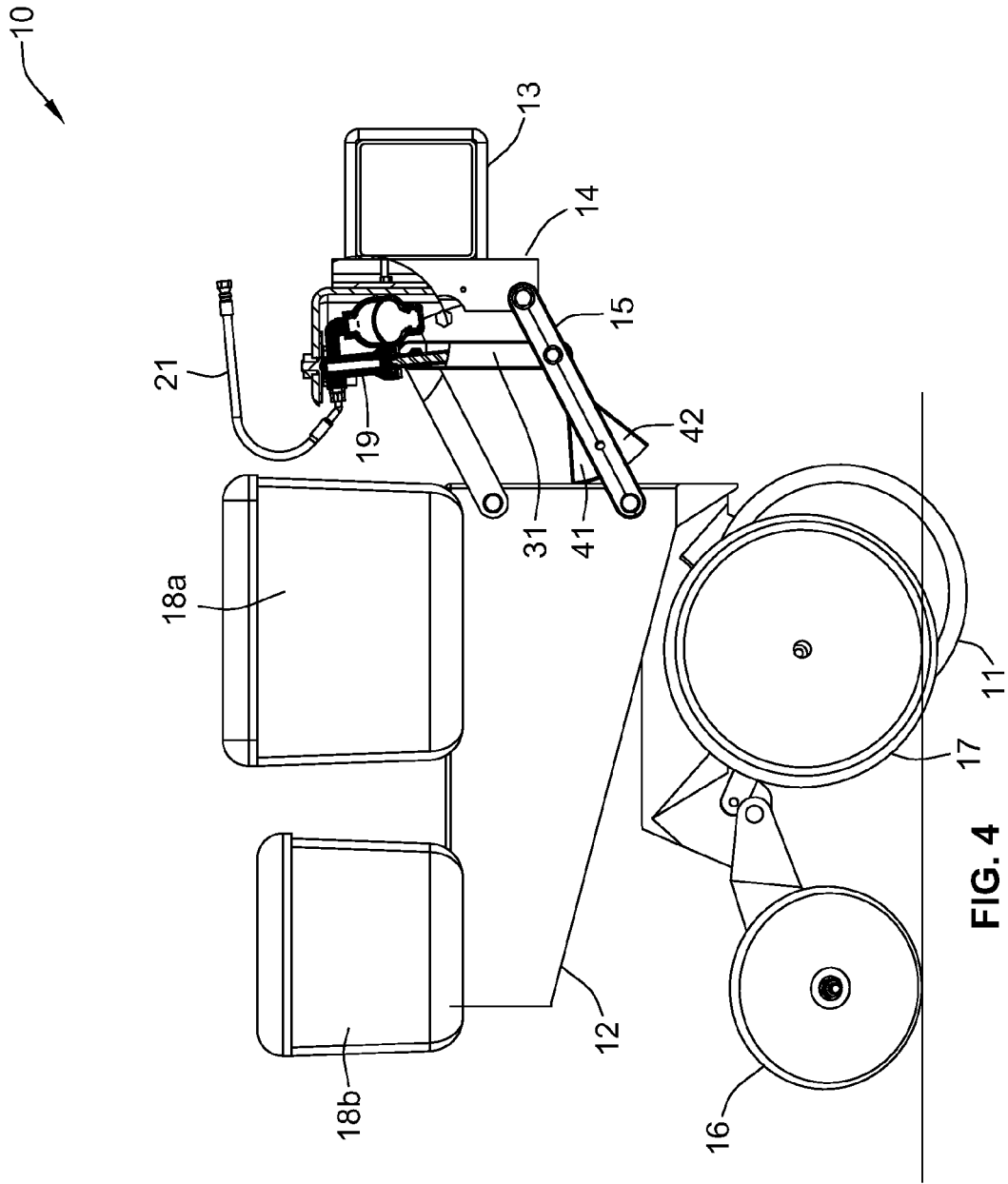
FIG. 4 is the same side elevation shown in FIG. 1 but with the linkage tilted downwardly to move the row unit to a lowered position.
Figure 5:
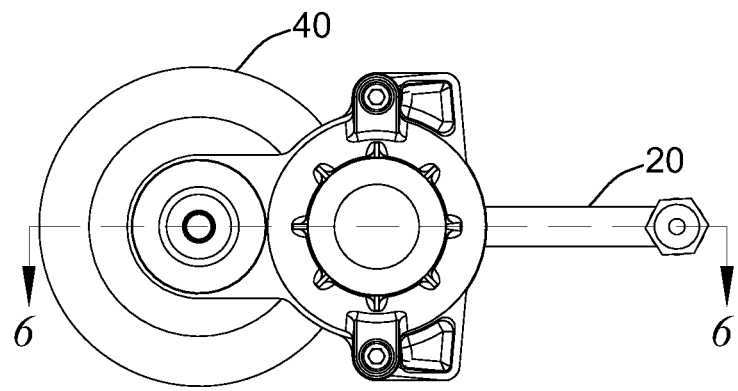
FIG. 5 is a top plan view of the hydraulic cylinder and accumulator unit included in the row unit of FIGS. 1-4.
Figure 6:
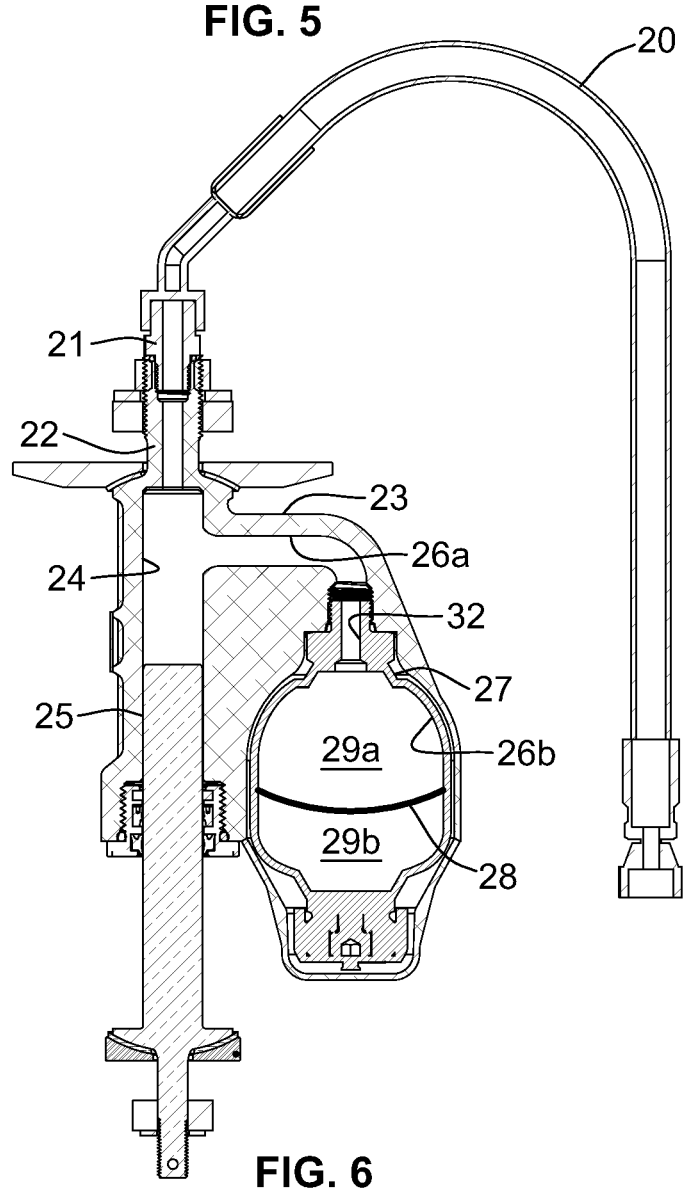
FIG. 6 is a vertical section taken along line 11-11 in FIG. 10.

The hydraulic cylinder 19 is shown in more detail in FIGS. 5 and 6. Pressurized hydraulic fluid from the tractor is supplied by a hose 20 to a port 21 that leads into a matching port 22 of a housing 23 that forms a cavity 24 of a hydraulic cylinder containing a ram 25. The housing 23 also forms a side port 26a that leads into cavity 26b that contains a gas-charged hydraulic accumulator 27. The lower end of the cavity 24 is formed by the top end surface of the ram 25, so that the hydraulic pressure exerted by the hydraulic fluid on the end surface of the ram 25 urges the ram downwardly (as viewed in FIG. 6), with a force determined by the pressure of the hydraulic fluid and the area of the exposed end surface of the ram 25. The hydraulic fluid thus urges the ram 25 in an advancing direction (see FIG. 4).

Figure 3:
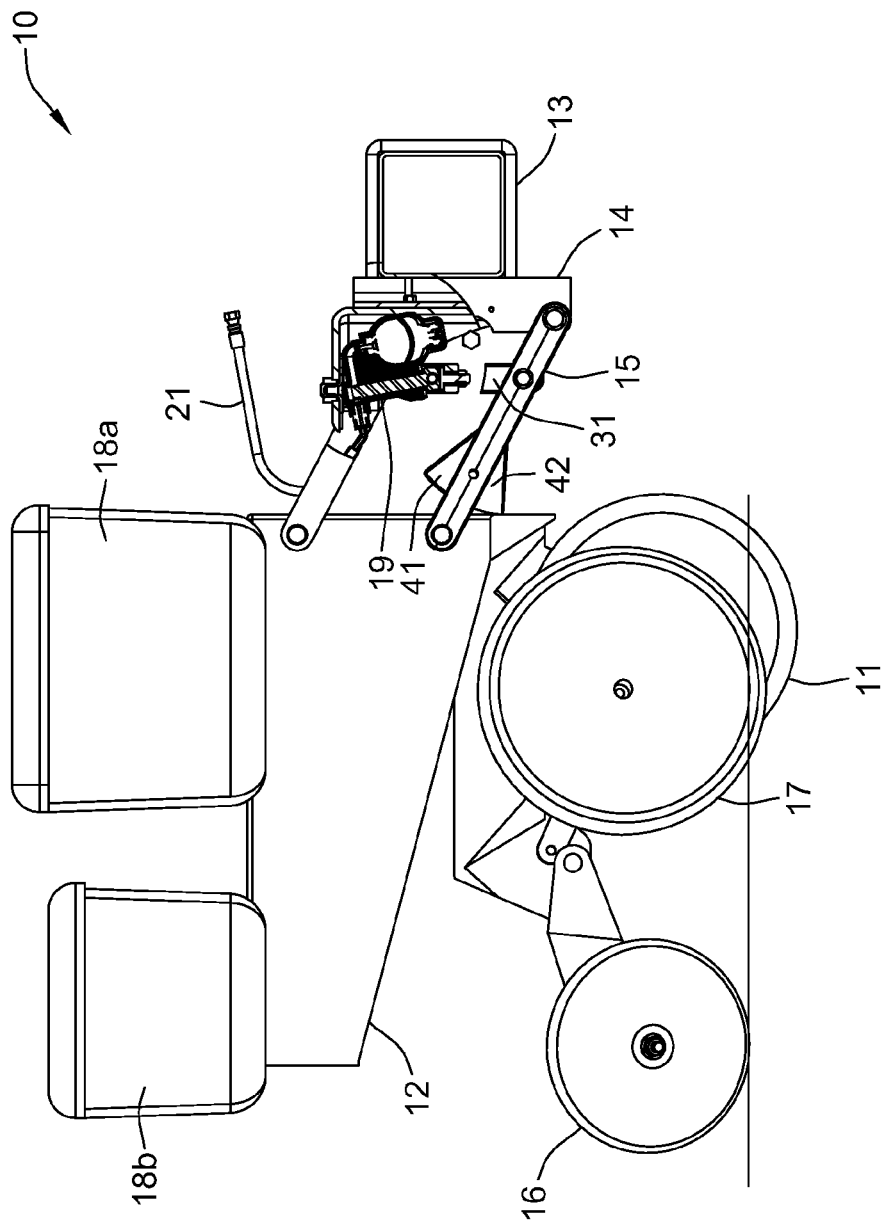
FIG. 3 is the same side elevation shown in FIG. 1 but with the linkage tilted upwardly to move the row unit to a raised position.
Figure 9:
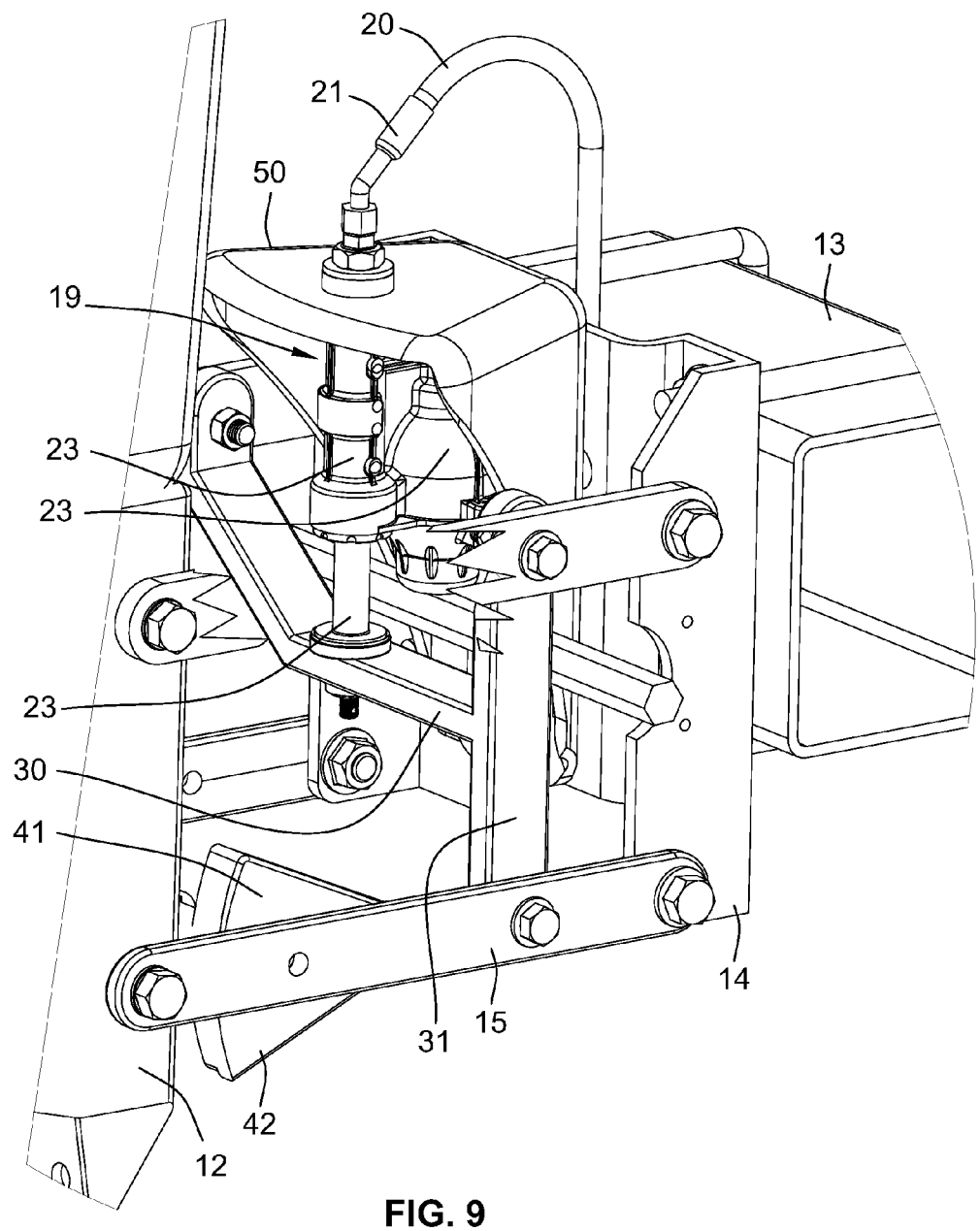
FIG. 9 is an enlarged perspective of the right-hand end portion of FIG. 1 with a portion of the four-bar linkage broken away to reveal the mounting of the hydraulic cylinder/accumulator unit.

As can be seen most clearly in FIG. 9, the hydraulic cylinder 19 and the accumulator 27 are mounted as a single unit on the front frame 14, with the lower end of the ram 25 connected to a cross bar 30 that is joined at one end to a vertical link 31. The upper and lower ends of the link 31 are pivotably attached to upper and lower links 15a and 15b, respectively, on one side of the four-bar linkage 15. The other end of the cross bar 30 is angled upwardly and pivotably attached to the upper link 15c on the opposite side of the four-bar linkage 15. With this mounting arrangement, retracting movement of the ram 25 into the cavity 24 tilts the linkage assembly 15 upwardly, as depicted in FIG. 3, thereby raising the row unit. Conversely, advancing movement of the ram 25 tilts the linkage assembly 15 downwardly, as depicted in FIG. 4, thereby lowering the row unit.

Figure 2:
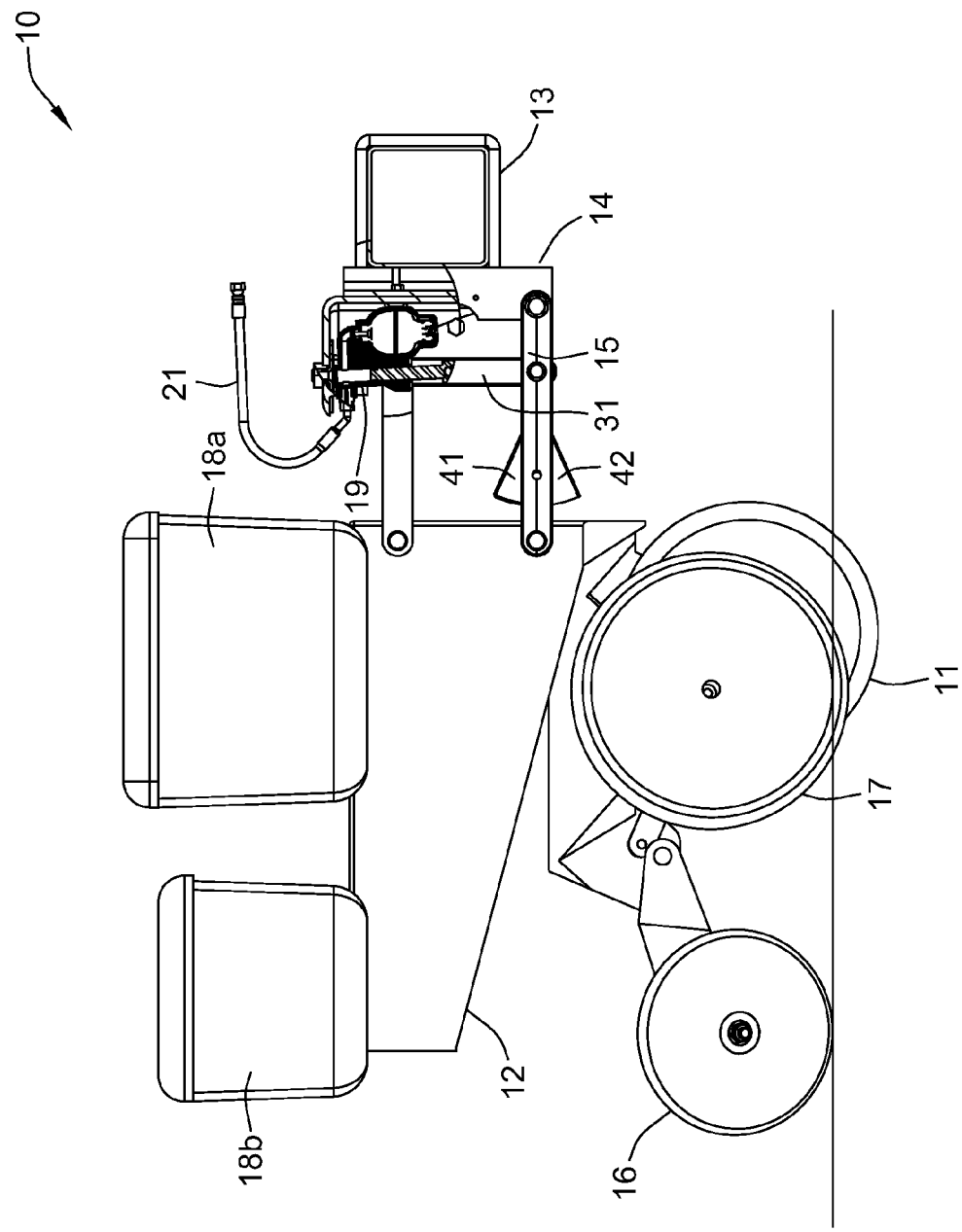
FIG. 2 is a partially sectioned side elevation of the planting row unit of FIG. 1 with the linkage that connects the row unit to the towing frame in a level position.

The accumulator 27 includes a diaphragm 28 that divides the interior of the accumulator into a hydraulic-fluid chamber 29a and a gas-filled chamber 29b, e.g., filled with pressurized nitrogen. FIG. 2 shows the ram 25 in a position where the diaphragm 28 is not deflected in either direction, indicating that the pressures exerted on opposite sides of the diaphragm are substantially equal. In FIG. 3, the ram 25 has been retracted by upward movement of the row unit, and the diaphragm 28 is deflected downwardly by the hydraulic fluid forced into the accumulator 27 by the retracting movement of the ram 25. In FIG. 4, the ram 25 has been moved to its most advanced position, and the diaphragm 28 is deflected upwardly by the air pressure as hydraulic fluid flows from the accumulator into the cavity 24. The use of this compact hydraulic down-force unit with an integral accumulator on each row unit provides the advantages of quick response and remote adjustability of a hydraulic down-force control system. If an obstruction requires quick movement, oil can flow quickly and freely between the force cylinder and the adjacent accumulator.

As can be seen in FIG. 4, advancing movement of the ram 25 is limited by engagement of stops 40, 42 on the lower links of the four-bar linkage 15, with the row unit frame 12. This prevents any further advancement of the ram 25. Advancing movement of the ram 25 expands the size of the cavity 24 (see FIG. 4), which causes the diaphragm 28 in the accumulator 27 to deflect to the position illustrated in FIG. 4 and reduce the amount of hydraulic fluid in the accumulator 27. When the ram 25 is in this advanced position, the row unit is in its lowermost position.

In FIG. 3, the ram 25 has been withdrawn to its most retracted position, which can occur when the row unit encounters a rock or other obstruction, for example. When the ram 25 is in this retracted position, the row unit is in its uppermost position. As can be seen in FIG. 3, retracting movement of the ram 25 is limited by engagement of stops 40, 42 on the lower links of the four-bar linkage 15, with the row unit frame 12.

Retracting movement of the ram 25 reduces the volume of the cavity 24 (see FIG. 3), which causes a portion of the fixed volume of hydraulic fluid in the cylinder 19 to flow into the chamber 29a of the accumulator 27, causing the diaphragm 28 to deflect to the position illustrated in FIG. 3. This deflection of the diaphragm 28 into the chamber 29b compresses the gas in that chamber. To enter the chamber 29a, the hydraulic fluid must flow through a port 32 in the top of the accumulator 27, which limits the rate at which the hydraulic fluid flows into the accumulator. This controlled rate of flow of the hydraulic fluid has a damping effect on the rate at which the ram 25 retracts or advances, thereby avoiding sudden large movements of the moving parts of the row unit, including the V-opener 11.

When the external obstruction causing the row unit 10 to rise is cleared, the combined effects of the pressurized gas in the accumulator 27 on the diaphragm 28 and the pressure of the hydraulic fluid return the ram 25 to a lower position. This downward force on the V-opener 11 holds it in the soil and prevents uncontrolled bouncing of the V-opener 11 over irregular terrain. The downward force applied to the V-opener 11 can be adjusted by changing the pressure of the hydraulic fluid supplied to the cylinder 19.

As can be seen in FIGS. 5 and 6, the single unitary housing 23 forms both the cavity 26b that contains the accumulator 27 and the cavity 24 of the hydraulic cylinder 19 and the fluid passageway 24 that connects the cavity 24 of the hydraulic cylinder 19 to the cavity 27 of the accumulator. By integrating the hydraulic cylinder 19 and the accumulator 27 in a single housing, there is no relative motion possible between the cylinder 19 and the accumulator 27, with minimal possibility for fluid passageways to act like orifices. The cylinder 19 and the accumulator 27 remain in fixed positions relative to each other regardless of the movements of the planter row unit via the linkage assembly 15. In this way the upward motion of the ram 25 that occurs when the planter row unit rolls over an obstruction is directly converted into compression of the gas in the accumulator 27 without restriction. It also allows the accumulator 27, which is by definition an energy storage device, to be mounted in a fully enclosed and safe housing. The accumulator 27 can be securely mounted to avoid puncture or rapid discharge (if it comes loose), or damage from hitting another part of the implement or a foreign object. The integrated cylinder and accumulator is also a convenient single package for installation and replacement and minimizes the number of hydraulic hoses and adapters (potential leakage points).

Figure 7:
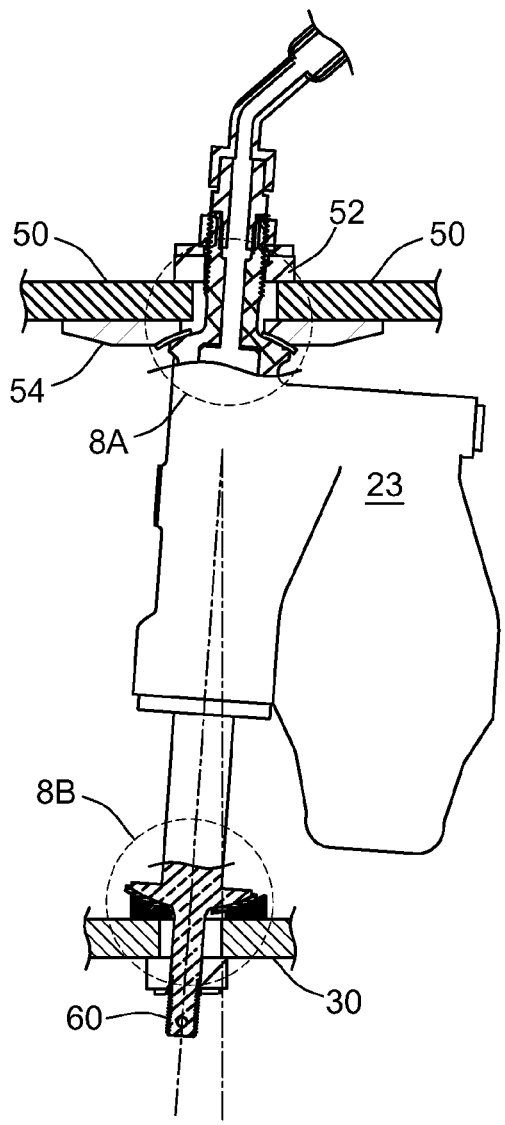
FIG. 7 is a side elevation of the unit shown in FIGS. 5 and 6 connected to a pair of supporting elements, with the support structures and the connecting portions of the hydraulic cylinder shown in section.
Figure 8A:
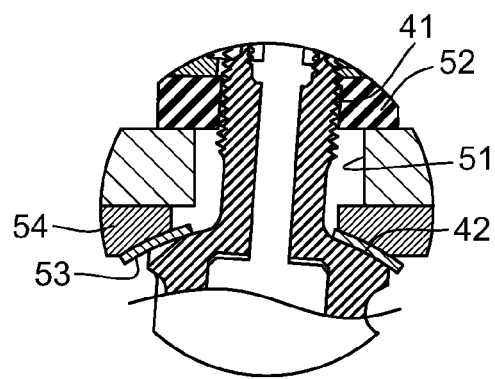
FIGS. 8A and 8B are enlarged cross sectional views of the supporting structures shown in section in FIG. 7.
Figure 8B:
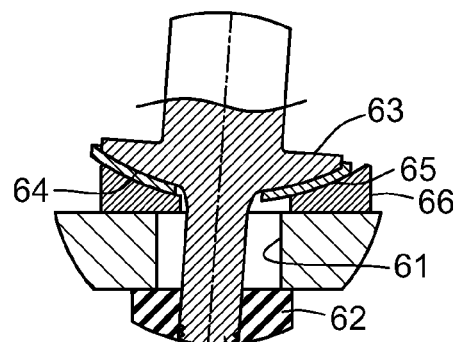

FIGS. 7, 8A and 8B illustrate in more detail how the illustrative hydraulic cylinder/accumulator unit is attached to the front frame 14 and the linkage assembly 15. The top of the unitary housing 23 forms a stem 41 that projects upwardly through a hole 51 in a bracket 50 attached to the front frame 14. The outer surface of the stem 41 is threaded to receive a nut 52 that connects the housing 23 to the bracket 50. The hole 51 is oversized and a rubber washer is installed on the stem 41 between the nut 52 and the bracket 50 to allow a limited amount of tilting movement of the housing relative to the bracket 50. At the base of the stem 41, beneath the bracket 50, the housing 23 forms a shoulder 43 that engages a conical bearing ring 53 that also engages a mating lower surface of a washer 54. Thus, the housing 23 can be tilted relative to the axis of the hole 51, with the shoulder 43 sliding over the lower surface of the bearing ring 53.

A similar arrangement is provided at the lower end of the ram 25, where a stem 60 extends downwardly through a hole 61 in the cross bar 30 that is pivotably attached to the linkage assembly 15. A nut 62 is threaded onto the stem 60 to connect the ram to the cross bar 30. The hole 61 is oversized and a rubber washer is installed on the stem 60 between the nut 62 and the cross bar 30 to allow a limited amount of tilting movement of the ram 25 relative to the cross bar 30. Above the cross bar 30, a flange 63 on the ram 25 forms a curved conical surface 64 that engages a mating surface of a curved conical bearing ring 65 that also engages a mating upper surface of a washer 66. Thus, the ram 25 can be tilted relative to the axis of the hole 61, with the flange 63 sliding over the upper surface of the bearing ring 65.

The use of a hydraulic system permits on-the-go adjustments to be made very rapidly because the hydraulic fluid is incompressible and therefore acts more directly than an air system. In addition, hydraulic fluids typically operate at higher pressures, which allows greater changes in applied forces. The accumulator 27 allows the fluid system to flex and float with the changing terrain and soil conditions. The accumulator 27 is preferably centrally mounted so that when any single row unit moves over an obstruction, the down-pressure cylinder 19 moves to displace the hydraulic fluid along a common set of lines connecting all row units. The gas in the accumulator is compressed at the same time, allowing for isolation among the row units so that upward movement of one row unit does not cause downward movement of other row units. Although the illustrative hydraulic ram is single-acting, it is also possible to use a double-acting ram, or a single-acting ram in combination with a return spring.

Another advantage of the compact hydraulic cylinder/accumulator unit is that it can conveniently mounted to the same brackets that are provided in many row units for mounting an air bag, to control the down pressure on the row unit. For example, in FIG. 9, the brackets 50 and 51 on which the hydraulic cylinder/accumulator is mounted are the brackets that are often connected to an air bag, and thus the same row unit can be used interchangeably with either an air bag or the hydraulic cylinder/accumulator to control the down pressure on the row unit.

Figure 10:
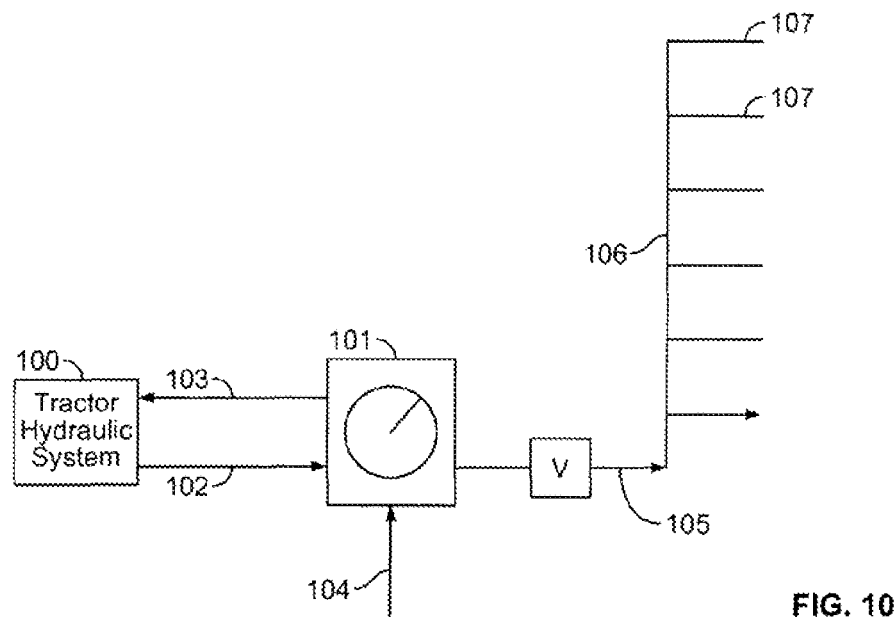
FIG. 10 is a schematic diagram of a first hydraulic control system for use with the row unit of FIGS. 1-9.

FIG. 10 is a schematic of a hydraulic control system for supplying pressurized hydraulic fluid to the cylinders 19 of multiple row units. A source 100 of pressurized hydraulic fluid, typically located on a tractor, supplies hydraulic fluid under pressure to a valve 101 via supply line 102 and receives returned fluid through a return line 103. The valve 101 can be set by an electrical control signal S1 on line 104 to deliver hydraulic fluid to an output line 105 at a desired constant pressure. The output line is connected to a manifold 106 that in turn delivers the pressurized hydraulic fluid to individual feed lines 107 connected to the ports 21 of the respective hydraulic cylinders 19 of the individual row units. With this control system, the valve 101 is turned off, preferably by a manually controlled on/off valve V, after all the cylinders 19 have been filled with pressurized hydraulic fluid, to maintain a fixed volume of fluid in each cylinder.

Figure 11:
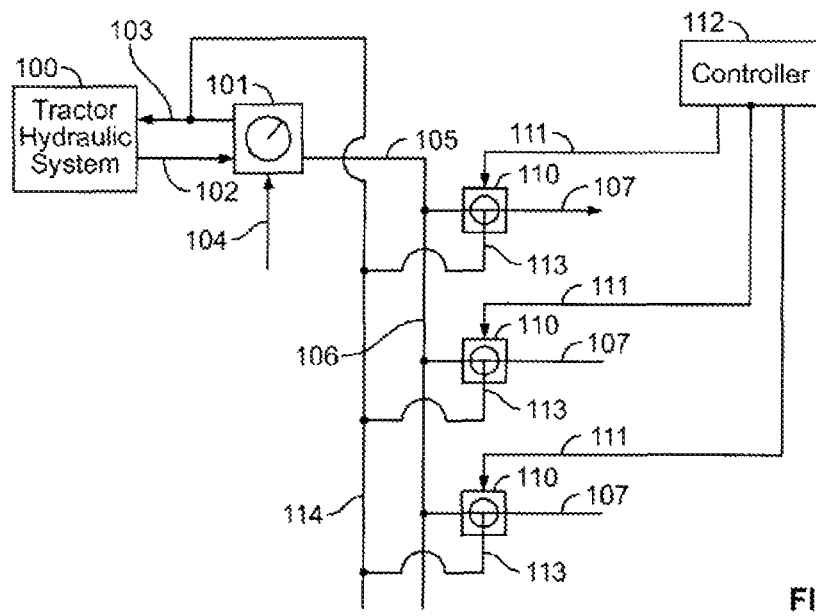
FIG. 11 is a schematic diagram of a second hydraulic control system for use with the row unit of FIGS. 1-9.

FIG. 11 is a schematic of a modified hydraulic control system that permits individual control of the supply of hydraulic fluid to the cylinder 19 of each separate row unit via feed lines 107 connected to the ports 21 of the respective cylinders 19. Portions of this system that are common to those of the system of FIG. 10 are identified by the same reference numbers. The difference in this system is that each separate feed line 107 leading to one of the row units is provided with a separate control valve 110 that receives its own separate control signal on a line 111 from a controller 112. This arrangement permits the supply of pressurized hydraulic fluid to each row unit to be turned off and on at different times by the separate valve 110 for each unit, with the times being controlled by the separate control signals supplied to the valves 110 by the controller 112. The individual valves 110 receive pressurized hydraulic fluid via the manifold 106, and return hydraulic fluid to a sump on the tractor via separate return line 113 connected to a return manifold 114 connected back to the hydraulic system 100 of the tractor.

Figure 12:
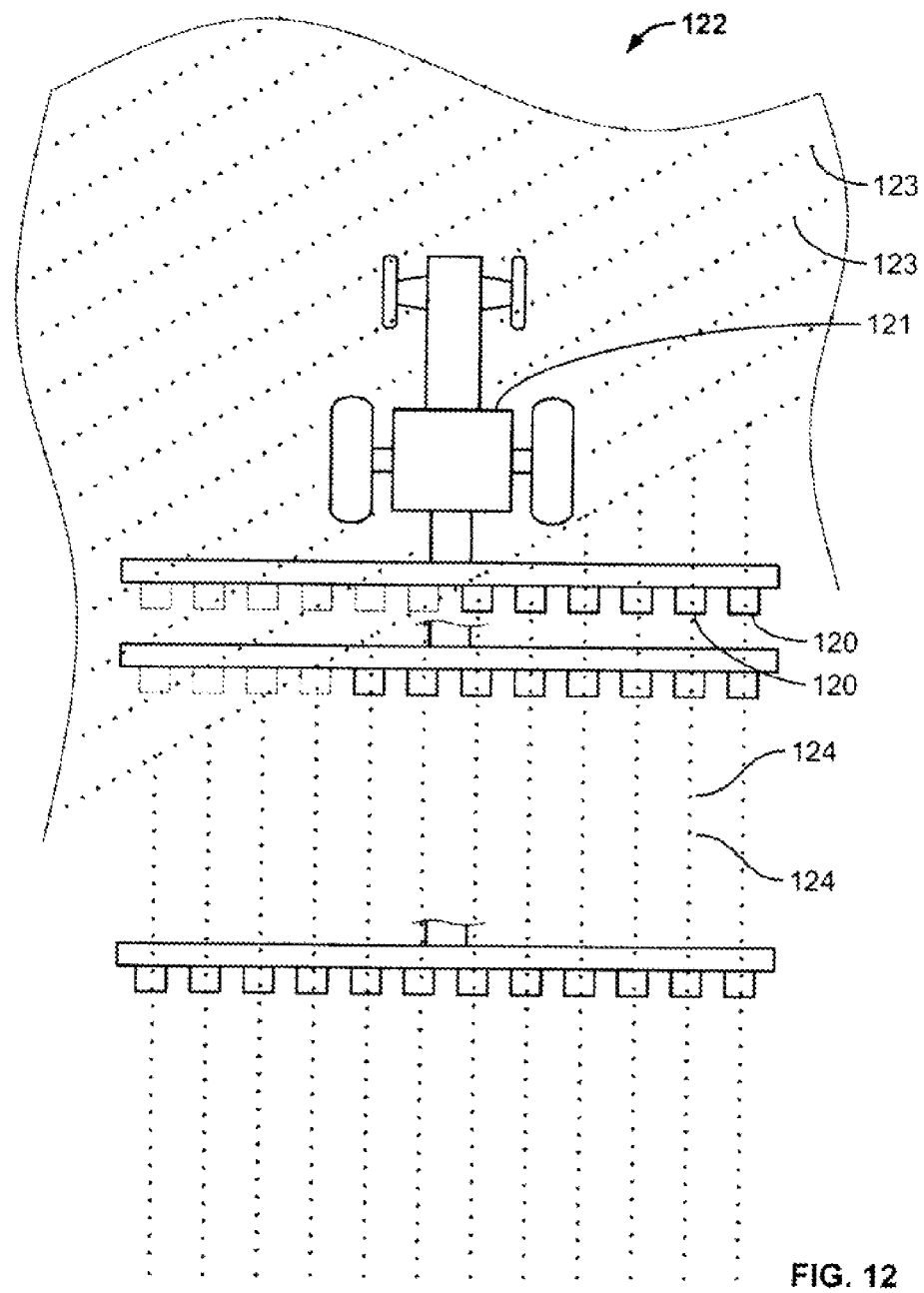
FIG. 12 is a diagram illustrating one application of the hydraulic control system of FIG. 11.

FIG. 12 illustrates on application for the controllable hydraulic control system of FIG. 11. Modern agricultural equipment often includes GPS systems that enable the user to know precisely where a tractor is located in real time. Thus, when a gang of planting row units 120 towed by a tractor 121 begins to cross a headland 122 in which the rows 123 are not orthogonal to the main rows 124 of a field, each planting row unit 120 can be turned off just as it enters the headland 122, to avoid double-planting while the tractor 121 makes a turn through the headland. With the control system of FIG. 11, the hydraulic cylinder 19 of each row unit can also be separately controlled to turn off the supply of pressurized hydraulic fluid at a different time for each row unit, so that each row unit is raised just as it enters the headland, to avoid disrupting the rows already planted in the headland.

One benefit of the system of FIG. 11 is that as agricultural planters, seeders, fertilizer applicators, tillage equipment and the like become wider with more row units on each frame, often 36 30-inch rows or 54 20-inch rows on a single 90-foot wide toolbar, each row unit can float vertically independently of every other row unit. Yet the following row units still have the down force remotely adjustable from the cab of the tractor or other selected location. This permits very efficient operation of a wide planter or other agricultural machine in varying terrain without having to stop to make manual adjustment to a large number of row units, resulting in a reduction in the number of acres planted in a given time period. One of the most important factors in obtaining a maximum crop yield is timely planting. By permitting remote down force adjustment of each row unit (or group of units), including the ability to quickly release all down force and let the row cleaner quickly rise, e.g., when approaching a wet spot in the field, one can significantly increase the planter productivity or acres planted per day, thereby improving yields and reducing costs of production.

On wide planters or other equipment, at times 90 feet wide or more and planting at 6 mph or more forward speed, one row unit must often rise or fall quickly to clear a rock or plant into an abrupt soil depression. Any resistance to quick movement results in either gouging of the soil or an uncleared portion of the field and reduced yield. With the row unit having its own hydraulic accumulator, the hydraulic cylinder can move quickly and with a nearly constant down force. Oil displaced by or required by quick movement of the ram is quickly moved into or out of the closely mounted accumulator which is an integral part of each row unit. The accumulator diaphragm or piston supplies or accepts fluid as required at a relatively constant pressure and down force as selected manually or automatically by the hydraulic control system. By following the soil profile closely and leaving a more uniform surface, the toolbar-frame-mounted row unit permits the planter row unit following independently behind to use less down force for its function, resulting in more uniform seed depth control and more uniform seedling emergence. More uniform seedling stands usually result in higher yields than less uniform seedling stands produced by planters with less accurate row cleaner ground following.

The term row unit refers to a unit that is attached to a towing frame in a way that permits the unit to move vertically relative to the towing frame and other units attached to that same towing frame. Most row units are equipped to form, plant and close a single seed furrow, but row units are also made to form, plant and close two or more adjacent seed furrows.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A down-force system for an agricultural implement having a frame and a plurality of row units movably mounted to the frame for vertical movement relative to the frame, the down-force system comprising:
   at least one hydraulic cylinder between the frame and each row unit to apply a force to each row unit to produce a controllable force acting on the row unit, each hydraulic cylinder assigned to one group of at least two groups of hydraulic cylinders, each of the at least two groups being associated with a respective plurality of row units;
   a control system operably connected to the hydraulic cylinders to control the hydraulic cylinders to vary the force applied by the hydraulic cylinders to the associated row unit, the control system configured to control each group of hydraulic cylinders independent of another group of hydraulic cylinders to enable the hydraulic cylinders of one group to apply a different force to the respective plurality of row units as compared to the hydraulic cylinders of another group; and
   a single unitary housing forming the at least one hydraulic cylinder and including a cavity containing at least one energy storage device.

2. The down-force system of claim 1, wherein the control system includes a controller, an operator input device, and a valve system.

3. The down-force system of claim 1, wherein the at least one hydraulic cylinder includes:
   a movable ram extending into the at least one hydraulic cylinder; and
   a hydraulic-fluid cavity within the at least one hydraulic cylinder for receiving pressurized hydraulic fluid for advancing the ram in a direction that pivots a respective row unit downwardly toward the soil;
   wherein the at least one energy storage device is positioned to allow upward movement of the at least one hydraulic cylinder over varied ground conditions.

4. The down-force system of claim 3, wherein the energy storage device is an accumulator positioned having a fluid chamber containing a diaphragm, the portion of the chamber on one side of the diaphragm being connected to the hydraulic-fluid cavity in the at least one hydraulic cylinder, and the portion of the chamber on the other side of the diaphragm containing a pressurized gas.

5. The agricultural system of claim 1, wherein the single unitary housing forms a fluid passageway connecting the at least one hydraulic cylinder and the at least one energy storage device.

6. A down-force system for an agricultural implement having a towing frame and a plurality of row units movably mounted to the towing frame for vertical movement relative to the towing frame, the down-force system comprising:

a plurality of attachment frames adapted to be rigidly connected to the towing frame, each of the attachment frames corresponding to a respective row unit of the plurality of row units;

a plurality of linkages pivotably coupled, respectively, to the plurality of attachment frames;

a plurality of row unit frames coupled, respectively, to the plurality of linkages, each row unit frame having a leading end pivotably coupled to a corresponding linkage to permit vertical pivoting movement of the row unit frame;

at least one furrow-forming device mounted on one or more of the plurality of row unit frames;

at least one hydraulic cylinder between a respective linkage and a respective attachment frame of each row unit to apply a force to each row unit to produce a controllable force acting on the row unit, the controllable force including a force acting on the furrow-forming device, each hydraulic cylinder assigned to one group of at least two groups of hydraulic cylinders, each of the at least two groups of hydraulic cylinders being associated with a respective plurality of row units;

a control system operably connected to the hydraulic cylinders to control the hydraulic cylinders to vary the force applied by the hydraulic cylinders to the associated row unit, the control system configured to control each group of hydraulic cylinders independent of another group of hydraulic cylinders to enable the hydraulic cylinders of one group to apply a different force to the respective plurality of row units as compared to the hydraulic cylinders of another group; and a single unitary housing forming the at least one hydraulic cylinder and including a cavity containing at least one energy storage device.

7. The down-force system of claim 6, wherein the control system includes a controller, an operator input device, and a valve system.

8. The down-force system of claim 6, wherein at least one of the hydraulic cylinders includes:

a movable ram extending into the at least one of the hydraulic cylinders; and a hydraulic-fluid cavity within the at least one of the hydraulic cylinders for receiving pressurized hydraulic fluid for advancing the ram in a direction that pivots a respective row unit downwardly toward the soil;

wherein the at least one energy storage device is positioned to allow upward movement of the at least one of the hydraulic cylinders over varied ground conditions.

9. The down-force system of claim 8, wherein the energy storage device is an accumulator positioned having a fluid chamber containing a diaphragm, the portion of the chamber on one side of the diaphragm being connected to the hydraulic-fluid cavity in the at least one hydraulic cylinder, and the portion of the chamber on the other side of the diaphragm containing a pressurized gas.

10. The down-force system of claim 8, wherein the movable ram is connected to the respective linkage.

11. The agricultural system of claim 6, wherein the single unitary housing forms a fluid passageway connecting the at least one hydraulic cylinder and the at least one energy storage device.

* * * * *